Patented Apr. 22, 1930

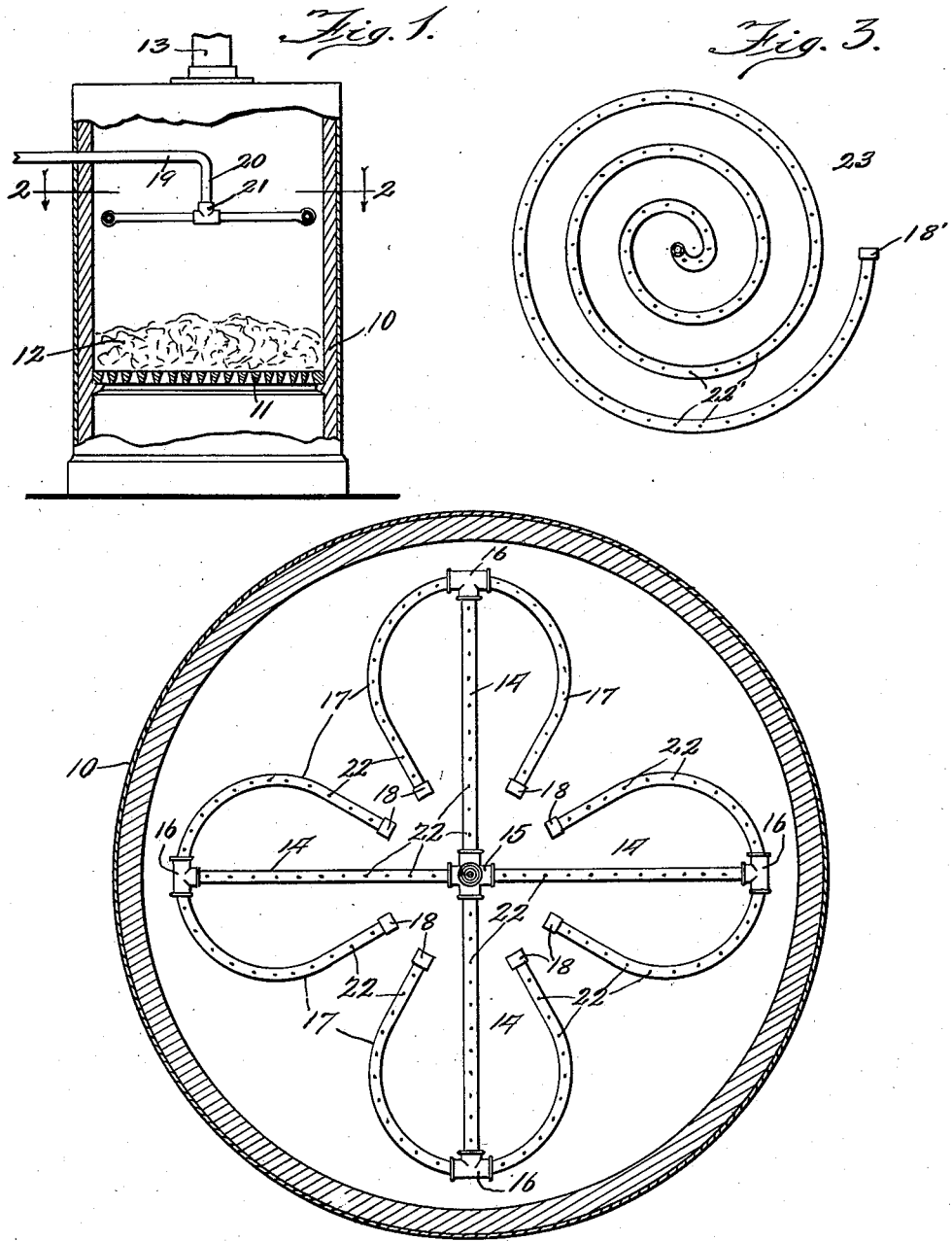
April 22, 1930. F. LESZCZEWICZ 1,755,697
FURNACE DEVICE FOR ENHANCING COMBUSTION OF FUEL
Filed Aug. 13, 1928

1,755,697

UNITED STATES PATENT OFFICE

FRANK LESZCZEWICZ, OF CHICAGO, ILLINOIS

FURNACE DEVICE FOR ENHANCING COMBUSTION OF FUEL

Application filed August 13, 1928. Serial No. 299,240.

The present invention relates to furnace attachments for supplying liquid, such as water to the fuel during the process of burning for enhancing the combustion thereof.

It is a known fact that fuel when dry burns quickly, and therefore a further object of the present invention is the provision of an attachment to be used in furnaces whereby water may be supplied and caused to drip in small quantities upon the burning fuel to retard the fast combustion thereof.

Another object of the present invention is the provision of an attachment of the character indicated for supplying water to the burning fuel, which in addition to retarding the fast combustion of the fuel would act upon the emitting smoke and soot for moistening the same and consequently for preventing its escape before the same is completely consumed.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views, Fig. 1 is a vertical cross-section of a furnace with the present invention positioned therein;

Fig. 2 is a horizontal cross-sectional view on line 2—2 of Fig. 1 showing the elevational top view of the present invention; and Fig. 3 is a top plan view of a modified form of the device.

Referring in detail to the present drawing there is shown a furnace 10 having grate 11 upon which fuel 12 is intended to burn. Said furnace is further provided with a smoke pipe 13.

My invention best illustrated on Fig. 2 includes four pipes 14 arranged crosswise and connected at their inner ends by cross union 15. Each of said pipes 14 at its outer ends carries T-pipe union 16 to which a pair of inwardly curving pipes 17 are attached. Each corresponding pair of said pipes 17 present an appearance of a horse-shoe. The ends of said pipes 17 are provided with caps 18.

An L-shaped pipe, including a horizontal portion 19 and a short vertical leg portion 20, is attached by one of its ends to cross union 15. At the latter's upright end integrally formed and upwardly extending is projection 21. The other end of said L-shaped pipe passes through the wall of the furnace and is connected to a water supplying source such as city pipes.

Water is supplied through said L-shaped pipe into union 15 and from there the water is distributed among pipes 14 and from there the same is passed through the several curving pipes 17. Said pipes 14 and 17 at their upper portions are provided with a series of minute apertures or openings 22 through which water is adapted to pass and upwardly spray and thereupon drop to the burning fuel 12.

The amount of water passing through pipes 14 and 17 or its degree of pressure or the degree of its spraying may be regulated by a pressure controlling device such as a valve which may be positioned upon the horizontal portion 19 of the L-shaped pipe and outwardly of the furnace 10.

The modified form of the invention, illustrated on Fig. 3, includes a spirally arranged pipe 23, provided upon its upper portion with a number of openings 22'. The outer end of said pipe 23 carries cap 18'. To the inner end of said pipe 23 an L-shaped pipe such as 19—20, may be affixed for supplying water to said pipe 23.

From the hereinabove description it will be seen that water passing through openings 22, or 22' and dripping upon fuel 12 will retard the combustion when the fuel is dry, and which would otherwise be quickly consumed, and at the same time said water acts upon the emitting smoke and unconsumed particles of the fuel, which would otherwise escape with the smoke, for moistening the same and thus for increasing their weight so as to prevent their ready escape through smoke pipe 13 and consequently to facilitate their consumption within the furnace 10 by the flames or heat emitting from fuel 12.

Although I do not desire to limit myself to the specific arrangement of pipes within the furnace for supplying water thereto, I have found from practical demonstration that the arrangement of the several water supplying pipes shown on Figs. 2 and 3 is the most practicable one since such arrangement facilitates the uniform distribution of the dripping water throughout the furnace and throughout the surface of the burning fuel.

While there is described herein a preferred embodiment of the present invention, it is nevertheless to be understood that minor changes may be made therein without departing from the spirit and scope of the invention as claimed.

What I claim as new is:

1. In combination with a furnace, a fuel saving device comprising a water supplying pipe, a plurality of pipes horizontally and uniformly arranged within the furnace, and said latter pipes being provided throughout their length with minute apertures in their upper walls and directed toward the top of the furnace and away from the bed of fuel for causing the spraying of water in an upward direction to prevent clogging of the apertures and to more uniformly dampen the bed of fuel.

2. In combination with a furnace, a fuel saving device comprising a water supplying pipe, a multiple union, said water supplying pipe being connected with said union, a plurality of pipes horizontally arranged and radially positioned within the furnace, said latter pipes being connected to said multiple union, a plurality of inwardly curving pipes attached to the outer end of each of said last named pipes and said first and last named pipes having minute apertures in their upper sides removed from the fuel bed for spraying water.

3. In combination with a furnace, a fuel saving device comprising a multiple union centrally positioned within the furnace, a water supplying pipe connection to said union, a plurality of radially and horizontally arranged pipes, said pipes by their inner ends being attached to said multiple union and extending at right angles to each other, and a plurality of curving branch pipes bent substantially in the shape of a horse shoe and attached at their middle portions to the outer end of each of said last named pipes so that the ends extend toward the multiple union, said first and last named pipes being provided with apertures in their upper portions removed from the fuel bed permitting the spraying of water.

4. A fuel saving device for furnaces comprising a system of water supply having an outlet connection extending through the wall of a furnace into the fire box and bent downwardly toward the bed of coals, a terminal fitting for minutely diffusing water issuing from the connection thereby to uniformly spray the entire bed of coals, and said fitting including a plurality of branches each having formed in their upper walls and extending throughout substantially their entire lengths, series of minute perforations for directing multiple relatively tiny streams of water toward the top of the firebox so that the resulting greatly diffused spray will fall evenly over the entire bed of coals.

In testimony whereof I affix my signature.

FRANK LESZCZEWICZ.